Patented Apr. 18, 1944

2,346,701

UNITED STATES PATENT OFFICE 2,346,701

TREATMENT OF PROPANE

Herman Pines and Vladimir N. Ipatieff, Chicago, Ill., assignors to Universal Oil Products Company, Chicago, Ill., a corporation of Delaware No Drawing. Application March 14, 1941, Serial No. 383,362

12 Claims. (Cl. 260—488)

This invention relates to the conversion of propane into valuable organic oxygen-containing compounds.

In one specific embodiment the present invention comprises a process for producing valuable organic oxygen-containing compounds by reacting propane with carbon monoxide in the presence of a catalyst containing a substantially anhydrous halide of aluminum.

By the process of this invention, propane which heretofore has been considered substantially unreactive with carbon-containing compounds is converted into substantial yields of ketones, carboxylic acids, and esters by treatment with carbon monoxide in the presence of a catalyst containing a halide of aluminum such as aluminum chloride or aluminum bromide preferably in the presence of an added hydrogen halide as hydrogen chloride or hydrogen bromide. Under suitable conditions of operation carbon monoxide reacts with an equivalent molecular proportion or more of propane to produce valuable organic oxygen compounds as herein set forth.

The aluminum halide catalyst as aluminum chloride or aluminum bromide may be used as such or supported on a substantially inert carrier such as charcoal, diatomaceous earth, firebrick, etc. Also the aluminum halide may be composited with one or more other metal halides of the Friedel-Crafts type such as the chlorides of zinc, iron, zirconium, copper, etc.

While the mechanism of the reaction between propane and carbon monoxide in the presence of a catalyst as aluminum chloride is not understood clearly or completely, it is suggested that a number of intermediate compounds may be involved in this conversion reaction. However, the mechanistic concept as herein set forth is not to be misconstrued as limiting the generally broad scope of the invention. Although not found in the reaction products, it is suggested that isobutyraldehyde is probably an important intermediate in the total reaction and that it is formed by interaction of propane and carbon monoxide as illustrated by the following equation:

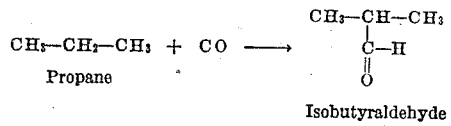

Isobutyraldehyde

A portion of said isobutyraldehyde is considered to undergo the so-called Cannizarro reaction to yield isobutyric acid and isobutyl alcohol, and these two substances undergo further reaction to form isobutylbutyrate. The remainder of the isobutyraldehyde probably undergoes aldol condensation forming an unsaturated octyl aldehyde as illustrated by Equations 6 and 7 which in the presence of aluminum chloride and nascent hydrogen (obtained by the action of an aluminum halide upon a hydrocarbon) yields an octyl ketone as illustrated by Equation 8.

(6) 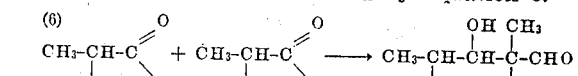

(7) 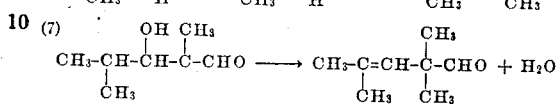

(8) 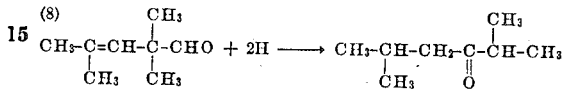

The present invention is carried out in either batch or continuous operation. When using a batch type of operation the propane, catalyst, and hydrogen halide are charged to a suitable autoclave, preferably provided with some means for agitation and the carbon monoxide is added thereto under a superatmospheric pressure of up to about 250 atmospheres as long as reaction occurs as evidenced by consumption of carbon monoxide and a decrease in pressure. The autoclave containing the reaction mixture is generally maintained at a temperature of from about 0° to about 200° C. The introduction of hydrogen to the reaction zone generally causes the reaction to be more selective and thus tends to inhibit the formation of relatively high boiling reaction products. The conditions of temperature and pressure can be varied depending upon the amount of hydrogen halide added to the reaction mixture. Although the interaction of propane and carbon monoxide occurs when hydrogen chloride is not added, the initial velocity of the reaction is substantially increased when hydrogen chloride is present in the propane charged. Even though hydrogen chloride is not added to the reactants this material is formed during the reaction by interaction of ketones, aldehydes, etc., with aluminum chloride to produce complex compounds from the aluminum chloride or other aluminum halide catalyst.

Such complex compounds of aluminum chloride with the reaction products are decomposed with ice and steam and distilled to separate the formed organic oxygen compounds into acidic material readily soluble in alkali, a mixture of organic oxygen compounds, and a relatively heavy residue of tarry material.

The organic oxygen compounds formed according to the process of this invention are valuable products suitable for use in the synthesis of hydrocarbons or of other organic compounds. Ketones and esters of carboxylic acids formed by interaction of propane with carbon monoxide may be used as solvents. Alcohols may also be derived from ketones by hydrogenation.

The following example is given to illustrate the character of results obtained by the use of the present process although the data presented are from a selected case and are not introduced with the intention of unduly limiting the broad scope of the invention.

13.7 molecular proportions of propane, 9.0 molecular proportions of aluminum chloride, and 3.8 molecular proportions of hydrogen chloride were placed in an autoclave to which carbon monoxide was charged to a total pressure of 125 atmospheres. The autoclave and reaction mixture contained therein were heated at 80° C. and when, by reason of carbon monoxide consumption, the pressure dropped to 80 atmospheres, the autoclave was recharged with carbon monoxide to a pressure of 125 atmospheres. After 12 hours of heating during which the autoclave was recharged 4 times with carbon monoxide, the reaction was substantially complete as evidenced by the fact that there was no further drop in pressure. Then 2.4 molecular proportions of unconverted propane was removed from the reaction mixture which was next poured upon ice to decompose the complex comprising essentially the reaction product and the aluminum chloride catalyst. In this reaction 497 parts by weight of propane reacted with 245 parts by weight of carbon monoxide in the presence of 1200 parts by weight of aluminum chloride. After hydrolysis with water about 600 parts by weight of organic reaction products were obtained from which 460 parts by weight of a steam distillate was separated. Treatment of the steam distillate with a 25% solution of sodium hydroxide removed 40 parts by weight of acidic material later recovered and identified as isobutyric acid. The major portion of the steam distillate separated from the reaction product (400 parts by weight) was insoluble in sodium hydroxide solution, distilled at 148–150° C., and consisted of a mixture of about 62% of 2,5 dimethyl hexanone and 38% isobutyl-isobutyrate. The 2,5-dimethyl hexanone was identified by hydrogenation to 2,5-dimethyl hexane in the presence of a nickel catalyst at 175° C. Also about 60 parts by weight of organic oxygen compounds were obtained boiling from 100° to 230° C. under 7 mm. pressure leaving 100 parts by weight of a tarry residue probably consisting of high molecular weight condensation products.

The nature of the present invention and its commercial utility can be seen from the specification and example, although neither section is intended to unduly limit its scope.

We claim as our invention:

1. A process for producing valuable organic oxygen-containing compounds which comprises reacting propane with carbon monoxide in the presence of a substantially anhydrous halide of aluminum.

2. A process for producing valuable organic oxygen-containing compounds which comprises reacting propane with carbon monoxide in the presence of a substantially anhydrous halide of aluminum at a temperature of from about 0° to about 200° C.

3. A process for producing valuable organic oxygen-containing compounds which comprises reacting propane with carbon monoxide in the presence of a substantially anhydrous halide of aluminum at a temperature of from about 0° to about 200° C. under a pressure of from substantially atmospheric to approximately 250 atmospheres.

4. A process for producing valuable organic oxygen-containing compounds which comprises reacting propane with carbon monoxide in the presence of a catalyst comprising essentially a composite of a substantially anhydrous halide of aluminum and a substantially inert carrier at a temperature of from about 0° to about 200° C. under a pressure of from substantially atmospheric to approximately 250 atmospheres.

5. A process for producing valuable organic oxygen-containing compounds which comprises reacting propane with carbon monoxide in the presence of a catalyst comprising essentially a composite of a substantially anhydrous halide of aluminum and another metal halide of the Friedel-Crafts type at a temperature of from about 0° to about 200° C. under a pressure of from substantially atmospheric to approximately 250 atmospheres.

6. A process for producing valuable organic oxygen-containing compounds which comprises reacting propane with carbon monoxide in the presence of a catalyst comprising essentially a substantially anhydrous halide of aluminum, another metal halide of the Friedel-Crafts type, and a substantially inert carrier at a temperature of from about 0° to about 200° C. under a pressure of from substantially atmospheric to approximately 250 atmospheres.

7. A process for producing valuable organic oxygen-containing compounds which comprises reacting propane with carbon monoxide in the presence of substantially anhydrous aluminum chloride at a temperature of from about 0° to about 200° C. under a pressure of from substantially atmospheric to approximately 250 atmospheres.

8. A process for producing valuable organic oxygen-containing compounds which comprises reacting propane with carbon monoxide in the presence of substantially anhydrous aluminum bromide at a temperature of from about 0° to about 200° C. under a pressure of from substantially atmospheric to approximately 250 atmospheres.

9. A process for producing valuable organic oxygen-containing compounds which comprises reacting propane with carbon monoxide in the presence of a substantially anhydrous halide of aluminum in the presence of a hydrogen halide at a temperature of from about 0° to about 200° C. under a pressure of from substantially atmospheric to approximately 250 atmospheres.

10. A process for producing valuable organic oxygen-containing compounds which comprises reacting propane with carbon monoxide in the presence of substantially anhydrous aluminum chloride in the presence of hydrogen chloride at a temperature of from about 0° to about 250° C. under a pressure of from substantially atmospheric to approximately 250 atmospheres.

11. A process for producing organic oxygen-containing compounds which comprises reacting propane with carbon monoxide in the presence of a substantially anhydrous aluminum halide and a hydrogen halide.

12. A process for producing organic oxygen-containing compounds which comprises reacting propane with carbon monoxide in the presence of substantially anhydrous aluminum chloride and hydrogen chloride.

HERMAN PINES.
VLADIMIR N. IPATIEFF.